United States Patent
Lupinetti et al.

(10) Patent No.: US 8,445,812 B2
(45) Date of Patent: May 21, 2013

(54) DEVICES FOR TREATING FILM MATERIAL, FOR INSTANCE FOR MANUFACTURING SANITARY PRODUCTS

(75) Inventors: Serafino Lupinetti, Elice (IT); Paolo Pasqualoni, Sambuceto di San Giovanni Teatino (IT)

(73) Assignee: Fameccanica.Data S.p.A., Teatino (Chieti) (IT)

( * ) Notice: Subject to any disclaimer, the term of this patent is extended or adjusted under 35 U.S.C. 154(b) by 875 days.

(21) Appl. No.: 12/522,080

(22) PCT Filed: Dec. 3, 2007

(86) PCT No.: PCT/IB2007/003830
§ 371 (c)(1),
(2), (4) Date: Aug. 12, 2009

(87) PCT Pub. No.: WO2008/081239
PCT Pub. Date: Jul. 10, 2008

(65) Prior Publication Data
US 2010/0044354 A1    Feb. 25, 2010

(30) Foreign Application Priority Data
Jan. 2, 2007  (EP) .................................... 07425001

(51) Int. Cl.
*B23K 26/14*        (2006.01)
(52) U.S. Cl.
USPC ................ 219/121.67; 219/121.78

(58) Field of Classification Search
USPC ............... 219/121.67, 121.6, 121.69, 121.85, 219/121.78, 121.83; 83/13, 55.1
See application file for complete search history.

(56) References Cited

U.S. PATENT DOCUMENTS

| 1,278,537 A | 9/1918 | Wegner |
| 5,500,507 A | 3/1996 | Yoshiaki |

FOREIGN PATENT DOCUMENTS

| EP | 0 465 666 | 1/1992 |
| EP | 1 447 068 | 8/2004 |
| EP | 1 736 272 | 12/2006 |
| GB | 1 081 589 | 8/1967 |
| GB | 2 400 723 | 10/2004 |
| JP | H01-245990 | 10/1989 |

OTHER PUBLICATIONS

International Search Report for PCT/IB2007/003830, mailed Jun. 17, 2008.
Written Opinion of the International Searching Authority for PCT/IB2007/003830, mailed Jun. 17, 2008.
Japanese Patent Office Action dated Sep. 18, 2012, in connection with Japanese Patent Application No. 2009-543532 (English translation).

*Primary Examiner* — Hsien Ming Lee
(74) *Attorney, Agent, or Firm* — Nixon & Vanderhye P.C.

(57) ABSTRACT

A device for cutting, using laser beams (B1, B2), a material (A) such as a material for manufacturing sanitary products comprises a supporting formation for the material (A), such as a motor-driven belt, including a net (72) for supporting said material (A) in a position corresponding to the area of cutting where the laser beam (B1, B2) acts. Typically said net is a wire net, e.g., made of steel, bronze or a combination of the two, to which there is preferentially associated a rotary cleaning brushes (9) and suction and/or air jets systems.

37 Claims, 4 Drawing Sheets

Fig_8

Fig_9 even at the beginning of the present description)—an action of treatment such as, for example, cutting.

DEVICES FOR TREATING FILM MATERIAL, FOR INSTANCE FOR MANUFACTURING SANITARY PRODUCTS

This application is the U.S. national phase of International Application No. PCT/IB2007/003830 filed 3 Dec. 2007, which designated the U.S. and claims priority to EP Application No. 07425001.0 filed 2 Jan. 2007, the entire contents of each of which are hereby incorporated by reference.

FIELD OF THE INVENTION

The present invention relates to the treatment of film material using laser-beam technology.

The invention has been developed with particular attention paid to its possible application in the sector of sanitary products, where the laminar (or film) material is constituted by sanitary products or by components of said products. From this standpoint, the purpose of the invention is an improvement in the solutions described in EP-A-1 447 068 and in EP-A-1 736 272, both filed in the name of the present applicant.

DESCRIPTION OF THE RELATED ART

In the development of the technology of cutting absorbent products and the like using laser technology various reasons of criticality have been encountered as regards the conveying structures (usually belt conveyors) designed to support the product before, after and, above all, during the course of the operation of laser treatment.

Using, for example, polyurethane belts with and without silicone coating (a coating which, at least in principle, should be transparent to the laser beam) it happens that in many cases the belts have a short service life, owing to the fact that the laser beam is in any case sufficiently powerful to damage their surface.

In addition to this, in order to guarantee positive conveying both of the web from which the products are cut out and of the products obtained, maintaining web and products as adherent as possible to the conveyor belt, it is usually envisaged that (according to a solution commonly adopted in the sector of conveying plants) the webs are subjected to suction. To do this, holes are made on the conveyor belts with a diameter in the region of 3-4 mm according to the different types of pattern.

Adopting this solution, it occurs, however, that when the laser beam cuts the product in a position corresponding to a suction hole, the product can end up assuming an incorrect position. The "vacuum" (i.e., the action of suction through the hole) determines in fact a certain ditching of the material in the hole: the beam consequently acts on the material in a position "out of focus", with the risk of local overheating of the material until it is brought to combustion. This results in a suboptimal cut, i.e., one with a hardened edge that is chemically converted such as to present a different, more yellowish, colouring.

In a way correlated to the phenomena outlined above, there arises also the problem linked to the fact that the materials subjected to laser treatment are usually films that can be subject to stretching and consequent necking down, with an adverse effect on the precision of the operations of treatment (cutting, welding).

As a result of stretching, there thus exists the risk that the treatment follows paths that are at least marginally different from the ones envisaged, thus giving rise to products with unacceptable characteristics, which must hence be rejected.

Devices for laser cutting including a wire net are known per se from different areas of technology, as witnessed e.g. by U.S. Pat. No. 5,500,507 or GB-A-1 081 589.

OBJECT AND SUMMARY OF THE INVENTION

The object of the present invention is to overcome the drawbacks outlined above.

According to the present invention, said object is achieved thanks to a device having the characteristics recalled specifically in the ensuing claims.

The claims form an integral part of the disclosure of the invention provided herein.

In particular, as regards the structure for conveying the material undergoing treatment, the solution described herein envisages, in an embodiment, using a conveyor belt made of net.

A net conveyor belt has on the other hand a certain tendency to get contaminated with residue of molten plastic material. It is possible to eliminate and/or reduce the contamination by appropriate optimal adjustment of focusing of the laser beam. The corresponding condition is, however, difficult to maintain over time without continuous interventions.

In addition, even operating with perfectly adjusted and focused laser beams, there is always a minimum of contamination, which, in the presence of high processing rates (for example, close to 1000 pieces/minute), is such as to render necessary an intervention of restoration of the belt.

For the above reason, in an embodiment, the problem of contamination is eliminated by inserting a cleaning brush that brushes against the belt itself and thus breaks up the contaminating molten fibres, which are subsequently removed through purposely provided mouths.

In an embodiment, the net conveyor is exposed to the action of a pressure gradient (10-100 mbar e.g. vacuum) and is supported by a highly apertured support member having an open area higher than 95%.

BRIEF DESCRIPTION OF THE ANNEXED DRAWINGS

The invention will now be described, purely by way of non-limiting example, with reference to the annexed drawings, in which.

DETAILED DESCRIPTION OF EXEMPLARY EMBODIMENTS

Figure 1:
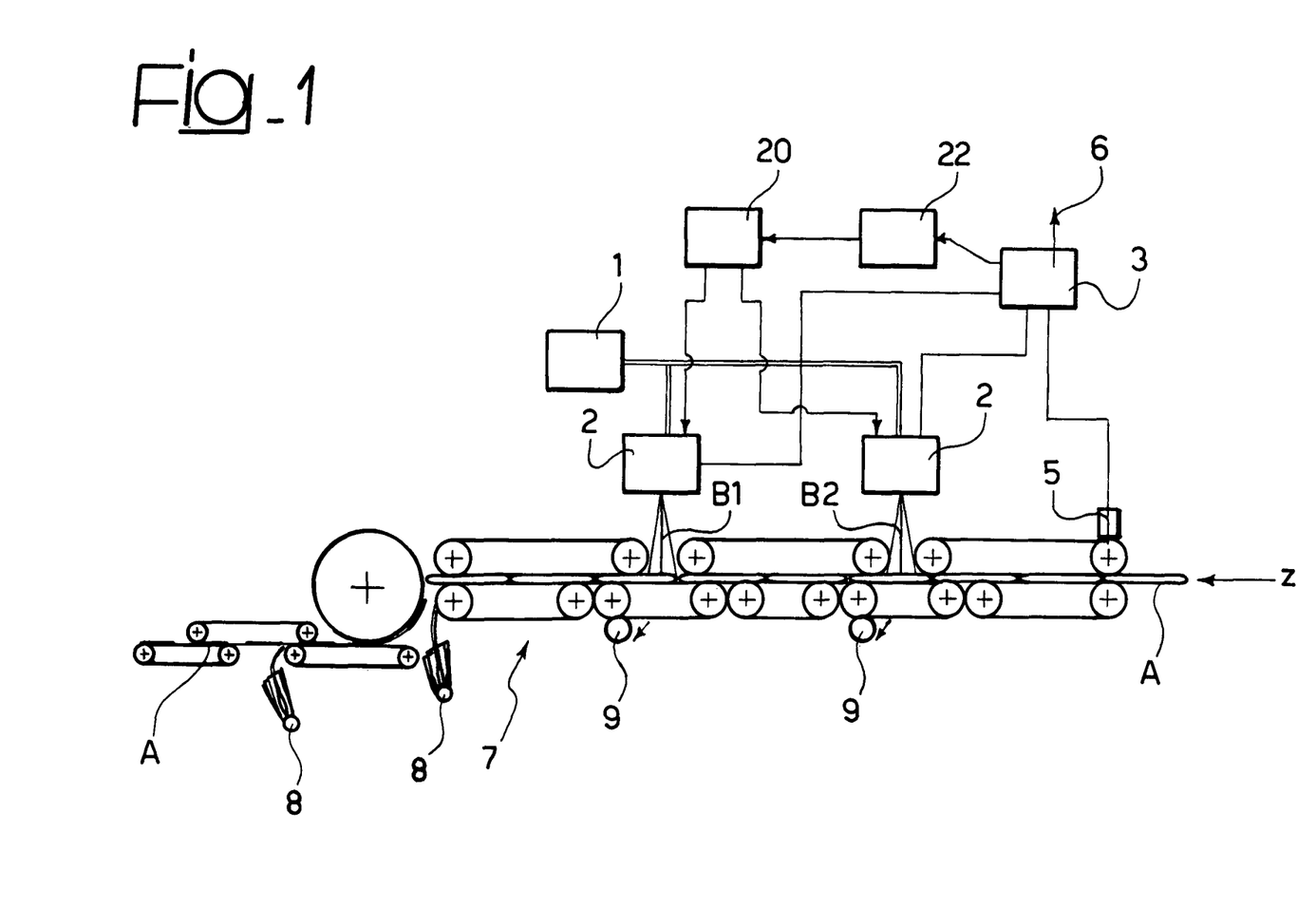
FIG. 1 is a side elevation of a system operating according to the invention.

In the general diagram of FIG. 1, the reference number 1 designates a laser source designed to effect an action of cutting on articles A, which move (with a speed that will be assumed herein, by way of example, constant and directed from right to left, as viewed in FIG. 1) in a direction designated as a whole by z.

In an embodiment, the source 1 is constituted by a laser source that can generate a laser beam, which, projected on the articles A, forms a spot of interaction thereon. The interaction spot is designed to exert on the articles A themselves—according to criteria in themselves known (see, for example, EP-A-1 447 068 and EP-A-1 736 272, already cited previously)—an action of cutting along a predetermined path, corresponding, for example, to the contour of the articles A themselves. As explained in greater detail in the documents cited above, these are, in the case of the articles A, sanitary products or else components (film, etc.) for said products.

The treatment can be performed in a continuous way or else in a discontinuous way, i.e., in spots or stretches, so as to give rise, for example, to a perforation in spots or stretches (so-called punching or dinking).

In the exemplary embodiment illustrated herein (which, it is recalled, is purely an example), the laser beam produced by the source 1 is sent to two deflection systems 2.

Each system 2 is able to send back in the direction of the articles A a respective portion (B1 or B2) of the laser beam received from the source 1 bestowing upon said respective portion of beam a movement of deflection that is principally in a direction transverse to the direction of movement of the articles A (axis x of FIGS. 2 and 3) as well as—in a preferred way—also in the direction of said movement (axis z of the figures).

For example, the source 1 can be a $CO_2$ or YAG laser source (or else, even a semiconductor and/or an optical-fibre laser source, possibly having associated thereto amplifier devices that bestow the necessary power upon the beam generated). The deflection systems 2 can be constituted by devices currently available on the market, such as for example the optical scanning head, model No. HPM10A, produced by General Scanning, Inc. of Watertown (U.S.A.), or else by the products Harryscan 30 or VarioSCAN flex40, produced by the company Scanlab (Germany), or else Superscan-20 or Axialscan 30, manufactured by Raylase (Germany), all of these being scanners of the "three-axis" type.

In the above case, the laser beam leaving the source 1 is received by an input aperture of each deflection system 2 and deviated via a pair of mirrors with fast-recovery galvanometric movement.

Each of the laser beams B1 or B2 coming from each deflection system 2 may then arrive on the articles A in the form of a spot with a selectively determinable degree of focusing (in a way in itself known) by acting on deflection systems 2.

The range of action of each system 2 on the plane of the articles A can be a square or a rectangle W, the side dimensions of which can range typically between approximately 100×100 mm and approximately 500×500 mm, respectively along the axis x and along the axis z, according to the position and dimension of the third axis focusing lens used in the system 2 and the distance of this from the plane in which the articles A are located (plane of process). This means that the working area and the spot size of the laser beam are a function of the focal distance, of the size of the input laser beam to the scanner and of the position of the third axis lens of the scanner.

It will on the other hand be appreciated that the solution described is suited to being implemented also using, instead of a source 1 and two deflection systems 2 two sources, each of which generates a corresponding treatment beam B1 or B2. In the same way, the number of treatment beams used (and, accordingly, the number of deflection systems and/or sources used for their generation) can be greater than two.

Furthermore, the small dimensions of the scanning window imparted on the beams B1 and B2 enables availability of the corresponding systems for generation/scanning either combined or set alongside one another, instead of being cascaded with respect to one another.

To return to the diagram of FIG. 1, the reference number 3 designates an electronic control unit (such as, for example, a dedicated computer card or a stand-alone controller), which supervises operation of the system controlling the action of deflection exerted by the systems 2 on the beams B1 and B2. This occurs as a function of the signal supplied by a sensor/encoder 5 that detects the rate of advance of the articles A along the axis z.

Figure 3:
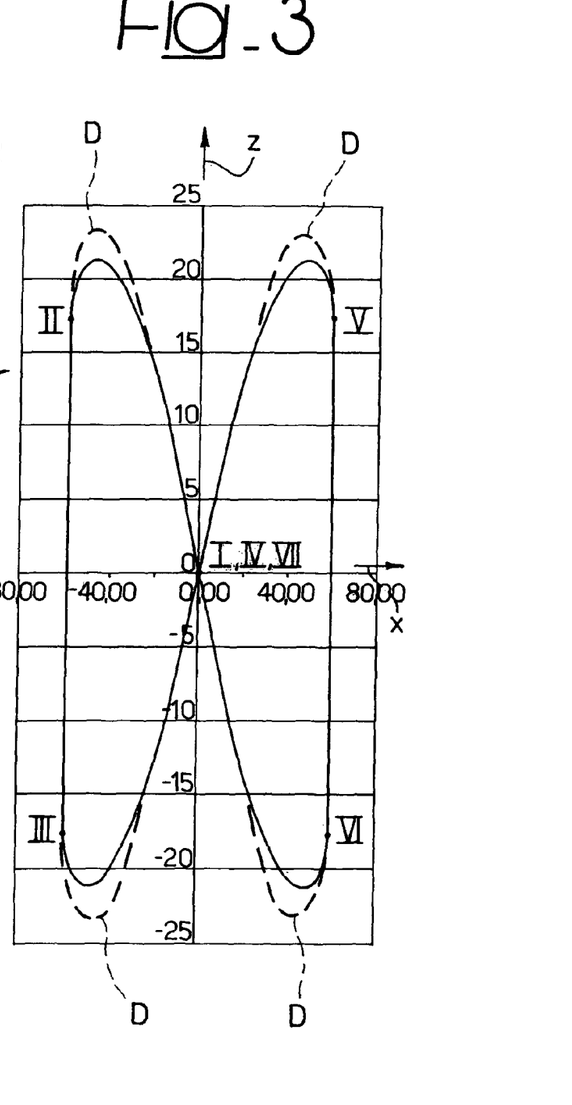

The reference number 6 designates as a whole an interface to a line controller, which supervises operation of the plant in which the device represented in FIG. 3 is inserted. Via the device 6 it is possible to intervene on the parameters of the plant, such as shapes, speeds, times, powers, offset, specific cutting and/or welding parameters, stretching, etc.

The reference 7 designates as a whole a conveying system used for feeding the articles A in the direction z. Advantageously, the system in question is constituted by a system with motor-driven belts, comprising, for example, pairs of endless-loop belts set on top of one another, the conveying branches of which act, respectively, on the bottom face and/or on the top face of the articles A lying between them.

Of course, the conveying system 7 can be of a type different from the one illustrated and envisage, for example, conveyors designed to operate exclusively on the bottom face of the articles A.

In an embodiment, the deflection systems 2 that generate the beams B1 and B2 that are to operate on the articles A are located in such a way that their working area comes to correspond with the presence of a support comprising a wire net having the characteristics recalled in greater detail in what follows.

In an embodiment, devices 8 (for example, air-suction devices) are provided for elimination of any possible processing waste or detritus.

Figure 2:
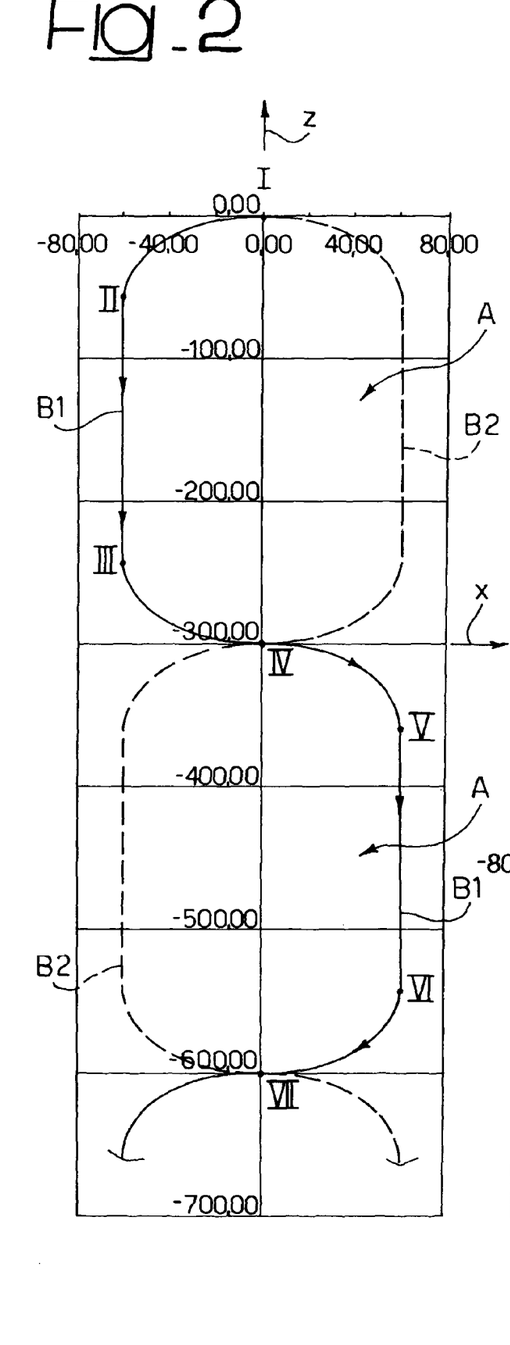
FIGS. 2 and 3 illustrate the criteria of operation of the system of FIG. 1.

FIGS. 2 and 3 illustrate the criteria, in themselves known (see, for example EP-A-1 447 068), that can be adopted in a system such as the one illustrated in FIG. 1 for carrying out a treatment of laser cutting on articles A, each having a contour defined by two arched or C-shaped portions. For the reasons that will emerge more evident from what follows, in FIG. 2 said arched portions are designated respectively by B1 and B2.

The embodiment described herein envisages in fact that to each of the beams B1 and B2 generated by the system 2 there is imparted a respective path of deflection such as to cause the respective beam not to define the contour of each individual article A completely, but only part thereof.

In the embodiment described herein, it is envisaged that each beam B1, B2 will be designed to describe a respective portion of the aforesaid contour. Each portion is defined in such a way that the movement of scanning of the article using the beam and the consequent definition of a corresponding part of contour advantageously exploits the superposition of the movement of advance of the articles along the axis z and the movement of deflection (both in a transverse direction, along the axis x, and in a longitudinal direction, along the axis z) imparted on the beams B1 and B2.

In an embodiment, the two beams B1 and B2 reverse their roles from one article A to the next. In the diagram of FIG. 2 it may be seen in fact that on each of the beams B1 and B2 is imparted (in a complementary way, hence with opposite directions along the axis x) a transverse movement of deflection such as to cause the spot projected by each beam on the articles A being cut to correspond to a zigzag or approximately sinusoidal path.

By operating in this way, for a given article A, the beam B1 carries out cutting of the right-hand side whilst the beam B2 carries out cutting of the left-hand side and then, for the next article A, the beam B1 carries out cutting of the left-hand side, whilst cutting of the right-hand side is now performed by the beam B2. After this, the process then passes, in the next article in the chain, to the situation where the beam B1 again carries out cutting of the right-hand side whilst the beam B2 carries out cutting of the left-hand side, and so on. Of course, the definitions "right-hand side" and "left-hand side", with reference to the main median axis of the articles A, are to be understood in an arbitrary way and can hence be exchanged with one another.

Furthermore, whilst the paths traversed by the beams B1 and B2 represented in FIG. 2 (and, in a corresponding way, the paths of deflection represented in FIG. 3) are symmetrical with respect to the main central axis of the articles A, this characteristic of symmetry does not in any way constitute an essential requisite.

In fact, the paths designated herein by B1 and B2 (in what follows, said paths will in effect not be distinguished from the beams that generate them in order to simplify the description) are constituted by serpentine or sinusoidal paths comprising half-waves that extend in an alternating and symmetrical way with respect to the principal longitudinal axis of the article A (i.e., with respect to the axis z of the drawings); said paths could, however, have an extension that is asymmetrical with respect to the aforesaid principal axis.

For reasons of continuity of the action of deflection of the beam, an embodiment of the invention may envisage that each of the paths B1 and B2 has an S-shaped serpentine pattern with half-waves arranged alternately on one side and on the other with respect to the axis z, so that the paths defined by the first beam B1 and by the second beam B2 cross one another at a point corresponding to said principal axis.

This characteristic is not, however, imperative, since the embodiment could be implemented with:
- a path B1 comprising all half-waves located on one side with respect to the principal longitudinal axis of the articles A; and
- a path B2 comprising in a complementary way all half-waves located on the other side with respect to the principal longitudinal axis of the articles A.

In this case, the paths B1 and B2 would present a pattern roughly resembling that of a rectified sinusoidal current with cusps located in a position corresponding to the points of crossing-over of the paths B1 and B2 in FIG. 2.

Once again it is recalled that, instead of resorting to two (sub)beams defining two complementary paths B1 and B2, the embodiment described herein can be obtained also using a larger number of beams.

The solution that envisages recourse to two beams may constitute a preferred solution in so far as it represents an ideal synthesis between quality of the results achieved and simplicity of realization.

To understand exactly the meaning of FIG. 3, it should in the first place be noted that the diagram of FIG. 2 corresponds to the two paths described in the plane of the articles A by the two treatment beams B1 and B2 coming from the source 1.

The "reference system" of FIG. 2 is hence constituted by the web or chain of articles A which advances along the conveyor 7 and in which the beams produced by the deflection systems 2 describe the paths B1 and B2.

At least in principle, paths such as the paths B1 and B2 illustrated in FIG. 2 could be defined each by one of the beams produced by the device 2 as a result of a pure and simple movement of deflection oriented along the axis x, i.e., in a direction transverse to the axis z. In other words, from a co-ordinated observation of FIGS. 2 and 3, the "half-waves" of the path B1 that are to the left with respect to the axis z could be obtained by simply deflecting the laser beam each time considered towards the left (negative values of the axis x of FIG. 3). The half-waves of the path B1 that are to the right with respect to the axis z could also be generated as a result of a pure and simple movement of deflection to the right in the diagram of FIG. 3 (positive values of x in said FIG. 3). In this case, the diagram of FIG. 3 would be reduced to a pure and simple horizontal segment.

However, in an embodiment, instead of corresponding to a pure and simple horizontal segment, the path of deflection represented in FIG. 3 is a closed path with a butterfly-shaped pattern substantially resembling a Lissajous figure: in an embodiment, each of the beams B1 and B2 produced by the systems 2 is in fact subjected, not only to a deflection along the axis x (i.e., in a direction transverse to the direction of advance of the articles A), but also to a movement of deflection along the axis z.

In the embodiment described herein, associated to the deflection systems 2 (it is recalled on the other hand that the plant as described herein may comprise even just one of these systems) is a device 20 for controlling the deflection, which, in a first possible embodiment of the invention, is provided with a manual regulator 22 that can be actuated by an operator.

The control 20 is able to intervene selectively on the action of deflection exerted by the systems 2 on the beams B1 and B2 in such a way that, given the same signal emitted by the control unit, the beams B1 and B2 undergo (in the direction of the axis z) a value of deflection that is different—usually higher than—the expected one.

The foregoing processing steps are executed according to the modalities represented schematically with the dashed lines D in FIG. 3. This operation corresponds to an alteration of the geometry of deflection aimed at taking into account the fact—the other parameters remaining the same—that the film constituting the treated product can be subjected to stretching in the direction of the axis z.

For example, assuming, with reference to FIG. 3, that the stretching is equal to 1% (possible stretching values range from 0.6% to 4%; typical values are comprised between 0.6 and 1.8%) in the direction of the axis z the intervention of the control module 20 is to modify the figure appearing in FIG. 3 so that its "dynamics" of oscillation in the direction of the axis z (originally comprised between approximately −21° and +21°, for an overall value of approximately 42°) is modified in such a way as to be equal to an angular value of approximately 42°, incremented by a y % designed to take into account the fact that the treated web (the articles A) is lengthened by x % as a result of stretching; linked to this deformation in z is another transverse one of necking down.

In this way, the action of deflection of the beams B1 and B2 is also modified in the sense of a stretching action in the direction of the axis z so as to compensate for the phenomenon to which the film is to be subjected.

In view of the percentage values involved, which are relatively low, the value of the longitudinal stretching of the web (x %) and the corresponding value of angular correction (y %) can in effect not be distinguished from one another, without involving trigonometric functions of compensation of the error of parallax.

As has already been said, the device 20 can be subjected to a manual control, carried out by an operator who, by observing the products coming off the system, is able to recognize reaching of the correct value of modification of the angle of deflection required to compensate for the stretch.

The solution described herein is also suited to being implemented according to modalities of complete automation, envisaging, for example, that the unit 3 is configured (in a way in itself known) so as to detect, starting from the signals supplied by the sensor 5, the amount of stretching to which the web of articles A is subjected.

This can be obtained, for example, by detecting the passage of reference elements provided on the web of articles A. According to the speed envisaged for unwinding the web, said reference elements should pass in front of the sensors at predetermined time intervals. The fact that said intervals are lengthened is an indication of the fact that the film is subjected to stretching, and the lengthening of said intervals constitutes a measurement of said stretching that can be used for driving the control unit 20.

Manual adjustment and automatic control can on the other hand coexist in the same plant, for example so as to enable manual intervention to carry out a first rough adjustment that is to be refined and maintained over time by an automatic control.

It should be noted that the correction of the stretching value can be made in percentage terms, independently along the axes z and y. Said values have then the intrinsic function of modifying the profile made, enabling the user to vary the morphological characteristics of the products coming off from the system (lengthening and/or widening of the profile). In other words, within certain limits the values of stretching enable optimization of the shape apart from the fact of recovering the stretching, but precisely in order to reduce possible approximations of design.

In the embodiment described herein, the operation of laser cutting is executed whilst the web or film is supported at the bottom by supporting structures comprised in the conveyor 7 and including a wire net.

Advantageously, the supporting (and conveying) belt is—as illustrated schematically in FIG. 1—an endless belt that is run over end return idlers and is mobile with a synchronized motion as the web of articles A advances.

Figure 4:
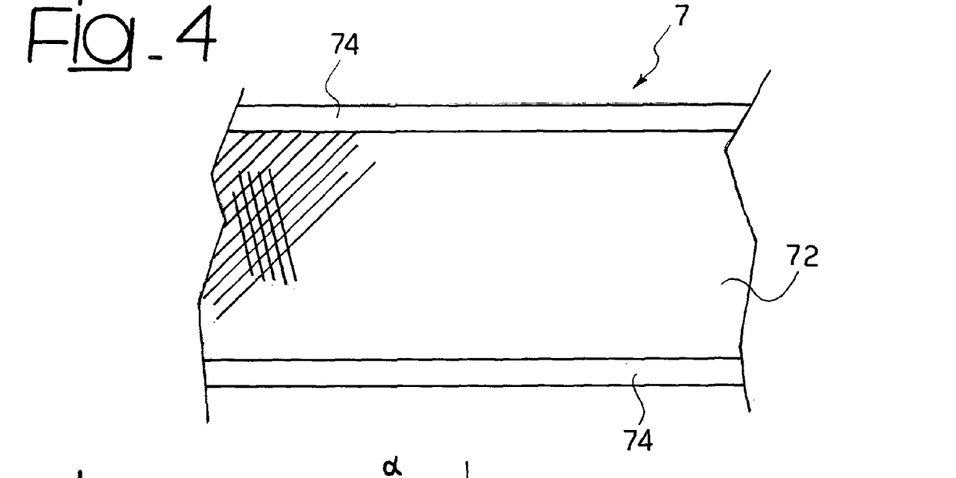
FIGS. 4 to 7 illustrate details of the solution described herein.

More specifically, as illustrated in FIG. 4 (which can be considered as an ideal top plan view of a stretch of the belt 7), this is a belt having a central area 72 made of a network and/or a wire net having two continuous side borders 74, for example made of plastic material such as polyurethane or silicon.

By way of example, the wire net of the central area 72 can present a width of band of approximately 190 mm, with the side borders 74 having a width of approximately 20 mm each, and an overall thickness of not more than 1.8 mm.

Clearly, the aforesaid dimensions are to be deemed purely indicative and non-limiting of the scope of the invention. The same applies also to the following further preferential characteristics:

material of the central area 72: steel, bronze, or a combination of the two (while steel and/or bronze have proven able to withstand the resulting thermal stress, it is on the other hand possible to think of using for the same purpose synthetic materials and/or mixed fibres, having adequate resistance to heat);

type and section of the warp wire: monofilament or multifilament with a section ranging between 0.1 and 1 mm with preferred values of between 0.2 and 0.3 mm;

type and section of the weft wire: monofilament or multifilament with a cross section ranging between 0.1 and 1 mm with preferred values of between 0.2 and 0.3 mm;

number of meshes per square centimeter in warp: from 10 to 40 (preferential values: 15-35 meshes);

number of meshes per square centimeter in weft: from 10 to 40 (preferential values: 15-35 meshes);

thickness of the net: from 0.2 to 2 mm (preferential values: 0.3-1 mm);

mass per unit area: from 0.5 to 3 $kg/m^2$ (preferential values: 1-2 $kg/m^2$);

permeability: from 3000 to $150001/m^2$ sec (preferential values: $5000-100001/m^2$ sec);

open area: from 10 to 50% (preferential values: 20-40%).

Usually there are no particular requirements on the side borders 74, which can be made of silicone or polyurethane and the main function of which is to prevent rapid deterioration of the net in the event of accidental contact on the fixed side guide, during the steps of continuous running. The side borders 74 are also useful for balancing the structure and limiting its deformation following upon tensioning.

A net conveyor belt of the type described above is able to withstand the aggression of the laser beam used in the cutting process, which has a spot size comprised between 100 and 300 μm. Considering the powers used (two beams of approximately 800 W installed power each) with the corresponding speed of process, this results in a supply of energy with an intensity comprised between 100 and 300 $kJ/m^2$.

Resistance to heat is not the only advantageous characteristic for the belt in the area exposed to the action of the laser beam. Added thereto is the mechanical resistance in so far as the belt is subjected to a pressure gradient (e.g. vacuum or gas jets/blows) for the purpose of stabilizing operation thereof as well as to composite dynamic stress, induced, during operation, both by the return idlers and/or the motor drive and by the mechanical action of one or more cleaning brushes 9, which, according to the experiments conducted by the applicant, it is advantageous to associate to the belts 7 (the cleaning brushes being two in number in the case of the example illustrated).

The brush 9 or each brush 9 is aimed at removing from the netted area 72 of the belt the molten and powdered residue of the raw materials treated, which under the action of the laser beam are in part sublimated and in part molten (areas impinged upon by the tails of the gaussian energy profile of cutting). Under the effect of the process vacuum, the molten (or thermally altered) material subject to cutting tends to deposit in the openings of the meshes of the net and in the interstices made between the filaments (which can be of the twisted type, in particular in the case of the warp) of the netted area 72.

If not removed, this contaminate would risk occluding the net, causing both the loss of the gripping action in the position of the raw material exerted by the vacuum, and the potential risk of anchorage/gluing of the treated product on the mesh itself, as a result of simultaneous bilateral melting of the materials.

From what is set forth above, it is evident that possible anti-adhesive characteristics of the net 72 (deriving, for example, from sprayed neutral oil, carbides and/or neutral silicone) are advantageous in so far as they do not reduce the properties of resistance to the energetic aggression of the laser beam used for carrying out the treatment.

Figure 5:
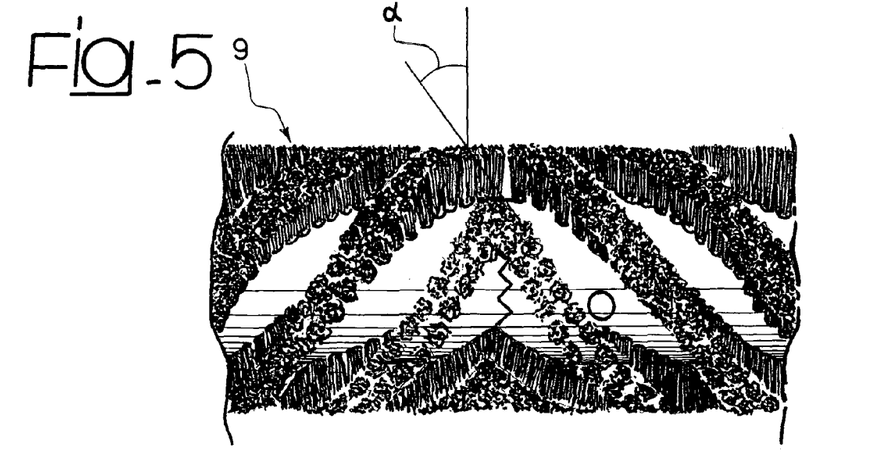

In an embodiment as illustrated in FIG. 5, the brush 9 or each brush 9 is a rotary brush with bristle made up of bronze, brass, steel or synthetic fibres, arranged according on full cover edge or to helical paths opposed to one another. Preferably, the angle of inclination of the helix, designated by α, as illustrated in FIG. 5, the brush 9 or each brush 9 is a rotary brush with bristle constituted by synthetic or metal fibres like bronze, brass, steel fibres, arranged according to a (radial and transverse) path that involves the use of low values both of pressure, between the brush 9 and the wire net 72, and of rate of rotation of the brush. This results in a reduced effect of wear of the elements involved, with consequent increase in their service life.

The motion of the brush 9 on the wire net 72 can be either concordant or opposite, according to the geometry of the net adopted. The r.p.m. is clearly linked to the rate of feed of advance of the net 72 (i.e., to the speed of processing of the line), with a ratio of approximately 1:1.2.

A feature of the embodiment described herein lies in the modalities adopted for carrying out the looped closing of the belt comprising the net 72.

In this regard, at least in principle, it is possible to think of making an endless belt with the ends glued together by means of a strip of polyurethane. It is found, however, that said strip is a weak point, such as to give rise to yielding of the joint after a short period of operation.

By providing the join by interweaving the metal wires of the net at the facing ends so as to form the endless loop, there is an improvement in the duration in terms of hours of operation, but the wires of the facing ends tend to "lift up", to form actual hooks that in many cases have the undesirable tendency to hook onto the products.

It is hence possible to envisage closing the end with a staggered open warping or according to a herring-bone (continuous zigzag) pattern. The process consists in a staggered termination of the filaments, arranged according to an alternating herring-bone pattern so as to distribute over the entire width of the netted area of the belt the termination iron "seed".

The corresponding process is completely manual and is inevitably costly.

An embodiment envisages hence closing the belt to form an endless loop by connecting the opposite ends with butt joins obtained by micro plasma welding or electro-brazing. With this procedure, the ends of each filament are welded together. As a result an openwork mesh is obtained with constant open area also in the area of closing.

The process is semi-automatic, and hence the corresponding costs are contained.

Another embodiment consists then in forming the endless belt by rigid wefting. In this case, the looped closing of the belt is carried out manually, by inserting, within finishing eyelets 76 set opposite to one another and mutually staggered, a weft wire 78, which guarantees correct termination thereof.

Figure 6:
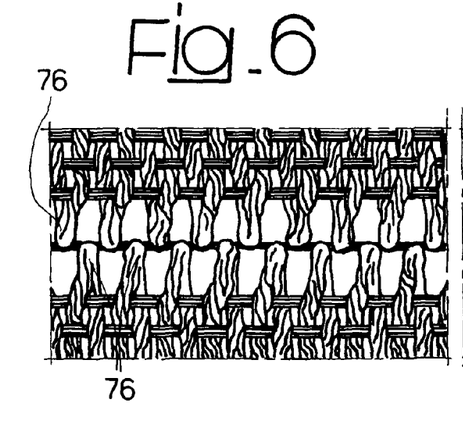
Figure 7:
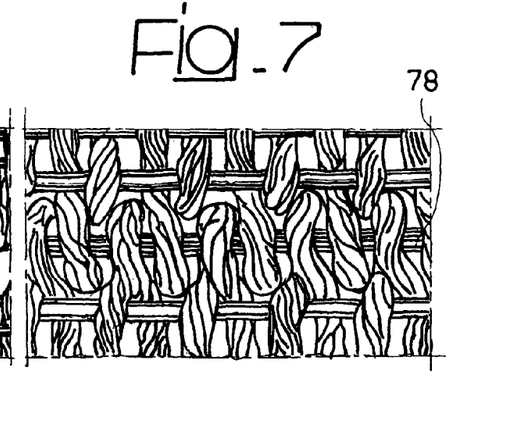

This solution is illustrated in FIGS. 6 and 7, from which it is possible also to appreciate the fact that:

the warp wires (i.e., the wires that extend "along the axis z" of the belt 7 and are designed—in the example illustrated—to form the eyelets 76) are preferentially multiple wires; and the wires of weft (i.e., the wires that extend "crosswise" to the belt 7) are preferentially single wires.

Of course, the plant illustrated in FIG. 1 also comprises various auxiliary accessories, which have the task of optimizing the performance of the plant in terms of quality and duration. Amongst these, it is possible to mention additional blowing points for dynamic cleaning of the net of the belt 7, top mouths for suction of the fumes, removable perforated supporting plates under the cutting area for daily cleaning of the fixed base for sliding of the belt, etc.

Figure 8:
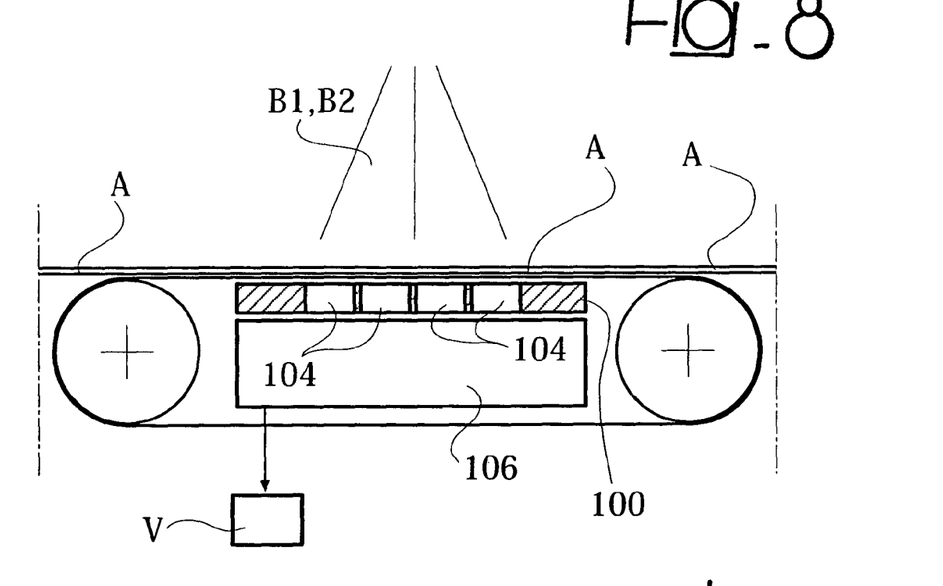
FIGS. 8 and 9 illustrate further details of the solution described herein
Figure 9:
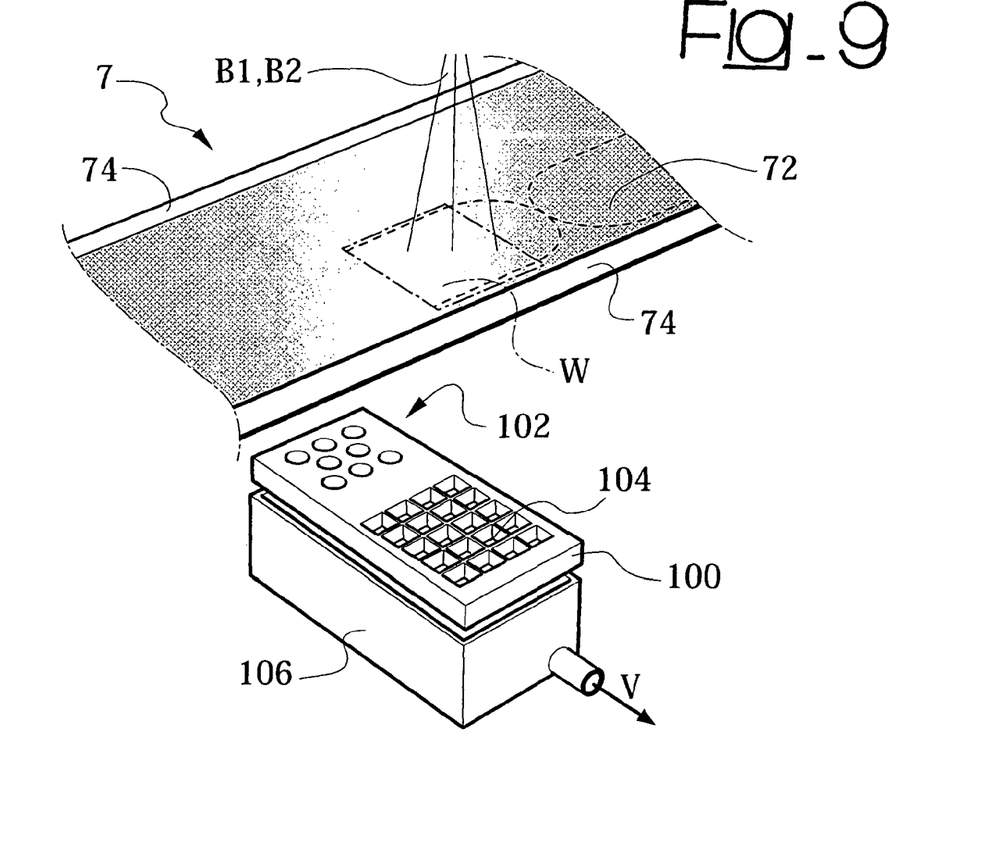

FIGS. 8 and 9 are more detailed representations of an embodiment for supporting the net 72 in correspondence with the area or zone W where the material A is intended to be cut by either of the laser beams B1, B2. Essentially, FIG. 9 is an exploded view that highlights the relative positioning of some of the elements shown in FIG. 8.

In both FIGS. 8 and 9 reference 100 denotes a support element essentially in the form of an apertured plate, that is a plate provided with apertures. In the embodiment shown, such apertures are arranged in two arrays 102, 104 respectively.

The apertures 102 are essentially in the forms of holes (e.g. round holes) provided in the body of the plate 100. Conversely, the apertures 104 are essentially in the form of a grid such as e.g. a square or rectangular grid extending over the area or zone W where the material A is intended to be laser cut, i.e. the area covered by the deflection system that produces the laser beam B1 or B2.

In an embodiment, the apertures 104 are formed in a grid comprised of blade-like elements or vanes. These blade-like elements or vanes are arranged to form therebetween apertures (of a square shape in the exemplary embodiment shown) surrounded by side walls that substantially extend either in a vertical direction, namely a direction orthogonal to the plane of the net 72 (as shown in the drawing), or in a horizontal direction, namely a direction parallel to the plane of the net 72.

In an embodiment, these elements are not solidly connected to each other. In an embodiment, these elements are arranged more or less in the fashion of a grating, wherein each element retains a moderate capability of displacement with respect to the neighbouring elements. The reasons for this loose connection arrangement will be explained in greater detail in the following.

Reference numeral 106 denotes a suction box ("vacuum chamber") intended to be connected—in a manner known per se—to a source of subatmospheric pressure V (i.e. "vacuum") so that a level of pressure under the atmospheric pressure is established in the chamber 106.

In operation, the various elements just described will give rise to a sort of sandwich-like arrangement including, from bottom-to-top with reference to FIGS. 8 and 9:

the suction box 106 connected to a source V of subatmospheric pressure, the plate 100 arranged over the suction box 106 to form a cover thereon, the net 72 sliding over the top surface of the plate 100, and the material of the articles A to be cut transported by the net 72.

The suction chamber 106 will thus tend to draw air into the box 106 itself via the apertures between the wires in the net 72 and the apertures 102, 104 in the plate 100 while the material of the article A will tend to obstruct such a flow of air.

This will result in a pressure gradient forcing the material of the articles A against the net 72, thus ensuring precise positioning and transport of the material of the articles A over the net 72

In another embodiment, a similar pressure gradient may be generated by means of jets of air or other gases projected (i.e. blown) towards the material of the articles A (downwardly, with reference to FIGS. 8 and 9), whereby the material of the articles A will be "pressed" against the net 72 by such jets. In such an embodiment, the suction box 106 may be dispensed with.

In still another embodiment, the pressure gradient may be created by using both a suction box such as suction box 106 and gas jets as described in the foregoing.

Whatever the embodiment adopted, the pressure gradient will stabilize the material of the article A against the net 72 which in turn will be supported in its sliding movement by the plate 100.

Also, the openings 102 and 104 will form pathways for the gas (air flow) induced by such a pressure gradient.

In the area of the apertures 104 (which is the area of the plate 100 intended to slidingly support the net 72 in correspondence with the area W where the material of the articles A is exposed to the action of the laser beams, the openings 104 will play an additional role in facilitating removal (e.g. by vacuum, that is by suction) of any residue of the raw materials treated which may detached from the net 72.

As indicated in the foregoing, under the action of the laser beam, such raw materials may be in part sublimated and in part molten, and such molten material may tend to deposit in the openings of the meshes of the net and in the interstices between the filaments of the net 72.

The applicants have found that the suction (and, in any case, the pressure gradient) exerted across the openings 104 and by manual frontal conveyer valves may be further beneficial in removing from the net 72 at least part of these residues, which are thus drawn e.g. into the suction box 106. This facilitates the cleaning action of the brush or brushes 9.

In fact, while FIG. 1 of the drawing shows brushes 9 located outside the loop formed by the net 72, the applicant have found it beneficial that at least one brushes provided is arranged within the loop formed by the net 72. In that way, the brush in question will be arranged to clean the surface of the net 72 opposite to the surface of the net supporting the material A, thus removing therefrom those residues of laser cutting that have passed through the meshes of the net and were not removed by the pressure gradient acting across the net.

Also, the blade-like conformation of the elements defining the apertures 104 in correspondence with the area W has been found to exert of a sort of "scraping" (i.e. doctor-blade like) action on the lower surface of the net 72 sliding thereover. Such a scraping action has been found to be particularly beneficial in avoiding accumulation of residues of molten material at the lower surface of the net 72, which is therefore kept clean. This avoids any undesired obstruction of the openings of the meshes of the net and/or the formation of any undesired "coating" at the underside of the net 72 which may undesirably "lift" (i.e. displace) the net 72 from its close sliding relationship over the upper surface of the plate 100.

The scraping action just described was found to be particularly effective when, as indicated, the elements defining the apertures 104 retain a moderate capability of relative movement due to a loose mounting arrangement.

Specifically, the joint stabilising/cleaning action was found to take place in a surprisingly effective manner when the apertured portion of the plate 100 intended to support the net 72 in correspondence with the area W of cutting of the material A by the laser beam B1 or B2 (namely the area of apertures 104) has an open area at least equal to 95% and preferably at least equal to 98%.

As used herein, open area will mean the ratio of the net open area of the apertures 104 to the surface area of the zone of the plate 100 where the openings 104 are provided—both areas being measured in the general plane of the plate 100, that is in the general plate of sliding of the net 72.

For instance, a 500×500 mm. square portion of the plate 100 with a surface of 25 cm/sq having provided therein a 5×5 matrix arrangement of twenty-five apertures each having a net area of 0.90 cm/sq will have an opera area of 90%.

Conversely, a same square portion of the plate 100 with a surface of 25 cm/sq having provided therein a 5×5 matrix arrangement of twenty-five apertures each having a net area of 0.95 cm/sq will have an opera area of 95%.

Finally, a square portion of the plate 100 with a surface of 25 cm/sq having provided therein a 5×5 matrix arrangement of twenty-five apertures each having a net area of 0.98 cm/sq will have an opera area of 98%.

These are of course just examples, and the arrangement described herein is in no way limited to square portions of the plate and/or n×n matrix arrangements of identical apertures. Any shape of the area of the plate 100 wherein the apertures are arranged, and any array of (identical or non identical) apertures is thus suitable for use in the arrangement described herein.

The exemplary embodiment of FIG. 9 includes a rectangular zone W with a 4×5 arrangement of identical square apertures.

Of course, without prejudice to the principle of the invention, the details of construction and the embodiments may vary widely with respect to what is described and illustrated herein, without thereby departing from the scope of the present invention, as defined by the annexed claims.

The invention claimed is:

1. A device for cutting film material using a laser beam, wherein a formation for supporting said film material is provided including a conveyor net for conveying and supporting said film material at a position corresponding to the area of cutting of said film material using said laser beam, the device further including:
 a support element for said conveyor net at said position corresponding to the area of cutting of said film material using said laser beam;
 a source of a pressure gradient arranged in correspondence with said support element to force said film material against said conveyor net;
 wherein said support element has at least an apertured portion defining a sliding surface for said conveyor net at said position corresponding to the area of cutting of said film material using said laser beam, wherein said apertured portion has an open area of at least 95%.

2. The device of claim 1, wherein said apertured portion has an open area of at least 98%.

3. The device of claim 1, wherein said apertured portion includes square or rectangular apertures.

4. The device of claim 1, wherein said apertured portion has a grid-like structure.

5. The device of claim 4, wherein said grid-like structure includes blade-like elements extending in a direction orthogonal or parallel to said sliding surface for said conveyor net.

6. The device of claim 4, wherein said grid-like structure includes elements loosely connected to retain a mutual capability of motion among said elements.

7. The device of claim 4, wherein said grid-like structure cooperates in a scraping relationship with said conveyor net.

8. The device according to claim 1, in which said conveyor net comprises a material selected from a group consisting of steel, bronze, combinations of steel and bronze, synthetic material, and mixed fibres.

9. The device according to claim 1, in which said conveyor net forms a netted central area of said formation for supporting said film material, wherein said netted central area is flanked by continuous side borders.

10. The device according to claim 1, in which said conveyor net is a woven mesh with weft and warp.

11. The device according to claim 10, in which said warp is a monofilament or multifilament warp with a cross section ranging between 0.1 and 1 mm.

12. The device according to claim 10, in which said warp is a warp with a number of meshes per square centimeter in warp of from 10 to 40.

13. The device according to claim 10, in which said weft is a monofilament or multifilament weft with a cross section ranging between 0.1 and 1 mm.

14. The device according to claim 10, in which said weft is a weft with number of meshes per square centimeter in weft of from 10 to 40.

15. The device according to claim 10, in which said warp is multifilament and said weft is monofilament.

16. The device according to claim 10, in which said conveyor net has a thickness of from 0.2 to 2 mm.

17. The device according to claim 10, in which said warp is a monofilament or multifilament warp with a cross section ranging between 0.2 and 0.3 mm.

18. The device according to claim 10, in which said weft is a monofilament or multifilament weft with a cross section ranging between 0.2 and 0.3 mm.

19. The device according to claim 10, in which said warp is a warp with a number of meshes per square centimeter in warp of from 15 to 35.

20. The device according to claim 10, in which said weft is a weft with number of meshes per square centimeter in weft of from 15 to 35.

21. The device according to claim 10, in which said conveyor net has a thickness of from 0.3 to 1 mm.

22. The device according to claim 1, in which said conveyor net has a mass per unit area of from 0.5 to 3 kg/m$^2$.

23. The device according to claim 1, in which said conveyor net has a permeability of from 3000 to 15000 l/m$^2$sec.

24. The device according to claim 1, in which said conveyor net has an openwork structure with open area of from 10 to 50%.

25. The device according to claim 1, in which associated to said conveyor net is at least one cleaning brush.

26. The device according to claim 25, in which said at least one cleaning brush is arranged to clean the surface of said conveyor net opposite the surface of the conveyor net supporting said film material.

27. The device according to claim 25, in which said at least one cleaning brush is a brush with metal bristle, or with synthetic polyester bristle.

28. The device according to claim 25, in which said at least one cleaning brush is a rotary brush.

29. The device according to claim 28, in which said at least one cleaning brush is provided with bristle arranged by full cover edge or according to helical paths, opposed to one another.

30. The device according to claim 28, in which said at least one cleaning brush is provided with bristle arranged by full cover edge or according to helical paths.

31. The device according to claim 30, in which said helical paths have an angle of inclination ($\alpha$) of approximately 45° with respect to a normal line to a surface of said conveyor net.

32. The device according to claim 25, in which said at least one cleaning brush is a brush with brass or steel bristle, or with synthetic polyester bristle.

33. The device according to claim 25, in which said at least one cleaning brush is a rotary brush, which is counter rotating with respect to the movement of sliding of said conveyor net over said sliding surface.

34. The device according to claim 1, in which said conveyor net has a mass per unit area of from 1 to 2 kg/m$^2$.

35. The device according to claim 1, in which said conveyor net has a permeability of from 5000 to 10000 l/m$^2$sec.

36. The device according to claim 1, in which said conveyor net has an openwork structure with open area of from 20 to 40%.

37. The device according to claim 1, in which said conveyor net forms a netted central area of said formation for homogeneous support of said film material, wherein said netted central area is flanked by continuous side borders.

* * * * *